United States Patent
Honda et al.

(10) Patent No.: US 6,928,206 B2
(45) Date of Patent: Aug. 9, 2005

(54) WAVELENGTH DIVISION MULTIPLEX OPTICAL SWITCH

(75) Inventors: Mitsutoshi Honda, Hitachi (JP); Yuichi Sawai, Hitachi (JP); Takao Ishikawa, Hitachi (JP); Takashi Naito, Mito (JP)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 10/225,297

(22) Filed: Aug. 22, 2002

(65) Prior Publication Data

US 2003/0185489 A1 Oct. 2, 2003

(30) Foreign Application Priority Data

Mar. 29, 2002 (JP) ........................................ 2002-093550

(51) Int. Cl.[7] ............................. G02F 1/295; G02B 6/10
(52) U.S. Cl. ............................. 385/16; 385/122; 385/5; 385/8; 385/4; 385/131
(58) Field of Search ............................. 385/5, 8, 4, 122, 385/16–20, 131, 132

(56) References Cited

U.S. PATENT DOCUMENTS

| | | | | |
|---|---|---|---|---|
| 4,693,547 A | * | 9/1987 | Soref et al. | 385/16 |
| 5,113,473 A | * | 5/1992 | Yoshida et al. | 385/131 |
| 6,353,690 B1 | * | 3/2002 | Kulishov | 385/10 |
| 6,567,206 B1 | * | 5/2003 | Minardi et al. | 359/320 |
| 6,584,260 B2 | * | 6/2003 | Arie et al. | 385/122 |
| 2003/0147584 A1 | | 8/2003 | Honda et al. | |
| 2003/0152739 A1 | | 8/2003 | Yamamoto et al. | |

FOREIGN PATENT DOCUMENTS

| | | | |
|---|---|---|---|
| JP | 63221306 A | * 9/1988 | ............ G02B/6/12 |
| JP | 5-216079 | 8/1993 | |
| WO | WO 01/27689 | 10/1999 | |

OTHER PUBLICATIONS

Visnovsky, S. et al. "Magnetooptical Polar Kerr Effect in Ferrimagnetic Garnets and Spinels" IEEE Transactions on Magnetics, vol. MAG–17, No. 6, Nov. 1981.*
Nikkei Electronics Jan. 29, 2001 (No. 788) (translation of a part).

* cited by examiner

Primary Examiner—Edward J. Glick
Assistant Examiner—Krystyna Suchecki
(74) Attorney, Agent, or Firm—McDermott Will & Emery LLP

(57) ABSTRACT

The invention provides an optical switch that consumes a less power, excels in a high-speed response, and possesses a structure suitable for a miniaturization and multi-channel switching. The optical switch switches a plurality of input signals to a plurality of output positions, in which a laminated structure that has a nonlinear optical layer and a buffer layer laminated in the same number as that of input parts intersects an optical path between the input parts and output parts. By providing the laminated structure using the nonlinear optical thin films, the invention achieves a small matrix optical switch excellent in a high-speed response and suitable for switching a large-capacity of information.

17 Claims, 9 Drawing Sheets

FIG. 5

| TiO2 CONTENT | REFRACTIVE INDEX | EXCITED LIGHT STRENGTH |
|---|---|---|
| 0 | 1.5 | 0.78 |
| 5 | 1.53 | 0.76 |
| 10 | 1.56 | 0.74 |
| 15 | 1.64 | 0.72 |
| 20 | 1.67 | 0.7 |
| 25 | 1.69 | 0.69 |
| 30 | 1.7 | 0.69 |
| 35 | 1.74 | 0.13 |
| 40 | 1.79 | 0.1 |

FIG. 9

| NONLINEAR OPTICAL MATERIAL | REFRACTIVE INDEX | REFRACTIVE INDEX VARIATION | SWITCHING | RESPONSE SPEED |
|---|---|---|---|---|
| 95Co3O4+5SiO2TiO2 | 3.1 | 2.1% | ◎ | 12ns |
| Sr2CuO3 | 3.1 | 2.1% | ◎ | 12ns |
| Sr2CoO3 | 2.9 | 2.0% | ◎ | 11ns |
| Sr2NiO3 | 3.0 | 2.3% | ◎ | 11ns |
| Fe3O4 | 2.8 | 3.3% | ◎ | 1.1ns |
| Co3O4 | 3.1 | 3.1% | ◎ | 1.2ns |
| Ni2FeO4 | 3.1 | 3.1% | ◎ | 1.2ns |
| Cr2FeO4 | 3.1 | 3.1% | ◎ | 1.2ns |
| VO2 | 3.2 | 2.0% | ◎ | 11ns |
| Dy4Fe6O12 | 1.9 | 3.1% | ◎ | 1.2ns |
| Er4Fe6O12 | 1.91 | 3.0% | ◎ | 1.0ns |
| 95Fe3O4+5SiO2TiO2 | 3.1 | 3.2% | ◎ | 1.2ns |
| Co3O4 | 2.6 | 2.0% | × | - |
| CoO | 3.2 | 0.05% | × | - |
| ZnO | 3.0 | 0.05% | × | - |

FIG. 10

| ZnO CONTENT (wet%) ZnO/(Fe2O3+ZnO) | AVERAGE PARTICLE DIAMETER (nm) | REFRACTIVE INDEX VARIATION | SWITCHING |
|---|---|---|---|
| 0 | 13.4 | 3.1% | ◎ |
| 5 | 13.7 | 3.1% | ◎ |
| 10 | 13.8 | 3.0% | ◎ |
| 15 | 13.9 | 3.0% | ◎ |
| 20 | 14.2 | 3.1% | ◎ |
| 25 | 14.5 | 3.0% | ◎ |
| 30 | 15.0 | 3.0% | ◎ |
| 35 | 15.3 | 0.2% | × |
| 40 | 15.5 | 0.05% | × |
| 45 | 15.8 | 0.05% | × |
| 50 | 15.8 | 0.05% | × |

WAVELENGTH DIVISION MULTIPLEX OPTICAL SWITCH

BACKGROUND OF THE INVENTION

The present invention relates to an optical switch, and specifically to an optical switch that controls the output of inputted light.

A further development of the information-oriented society involves building up an optical communication system that implements a high-speed transmission of a large-capacity of information. At present, the wavelength division multiplex (WDM) communication system has been developed, further accelerating the transmission speed of a network.

One of devices essential for a still faster optical communication system is a switching means of optical information. The conventional switching system of optical information required, at each relay point, a photoelectric transducer that converts optical information into electric information once and an electro-optic transducer that converts the electric information reversely into the optical information.

As the number of the relay points increases, the total power consumption of the photoelectric transducers and electro-optic transducers increases, and the switching speed decreases. Therefore, it is preferable to use an optical switch that switches the optical information directly in order to build up a still faster optical communication system.

As this type of optical switch, as disclosed in the "Nikkei Electronics" No. 8 issued on Jan. 29, 2000, the mechanical type switch, plane optical waveguide optical switch, mirror type optical switch, bubble type optical switch, and so forth have been examined up to now.

However, since the switching time of the conventional optical switch takes some millisecond, it is difficult to cope with the larger capacity and higher-speed for a future optical communication system. Also, the conventional optical switching system requires a high electric driving force for switching, and needs still higher energy consumption. As disclosed in the Japanese Patent Laid-open No. Hei 11-337988, an optical switch is proposed which attained a high-speed response by using a nonlinear optical material.

The optical switch disclosed in Japanese Patent Laid-open No. Hei 11-337988 arranges two nonlinear optical elements, and controls the switching by means of two different controlling lights; accordingly, the total size of the device becomes large. Therefore, it is difficult to miniaturize the optical switch for multi-channel switching. In addition, since the variation range of the refractive index is extremely small, the laser power for inducing the variation of about 2% of the refractive index is as high as about 5 to 50 $MW/cm^2$, and the power consumption of the total device increases.

SUMMERY OF THE INVENTION

The invention has been made in view of the foregoing, and provides an optical switch that consumes less power, is excellent in a high-speed response, and possesses a structure suitable for a miniaturization and multi-channel switching.

In order to solve the foregoing problem, there is provided an optical switch according to the present invention which switches a plurality of input signals to a plurality of output positions, in which a laminated structure that has a nonlinear optical layer and a buffer layer laminated in the same number as that of input parts intersects an optical path between the input parts and output parts.

BRIEF DESCRIPTION OF THE DRAWINGS

FIG. 5 illustrates the relation between the refractive index and the output light strength, depending on the contents of $TiO_2$;

FIG. 9 illustrates one example of the refractive index, refractive index variation, switching, and response speed for each nonlinear optical material;

FIG. 10 illustrates the composition percentage according to the contents of ZnO, average particle diameter, refractive index variation, and switching characteristics.

DETAILED DESCRIPTION OF THE PREFERRED EMBODIMENTS

[Embodiment 1]

Preferred embodiments of an optical switch according to the invention will be described with reference to FIG. 1 through FIG. 11.

Figure 1:
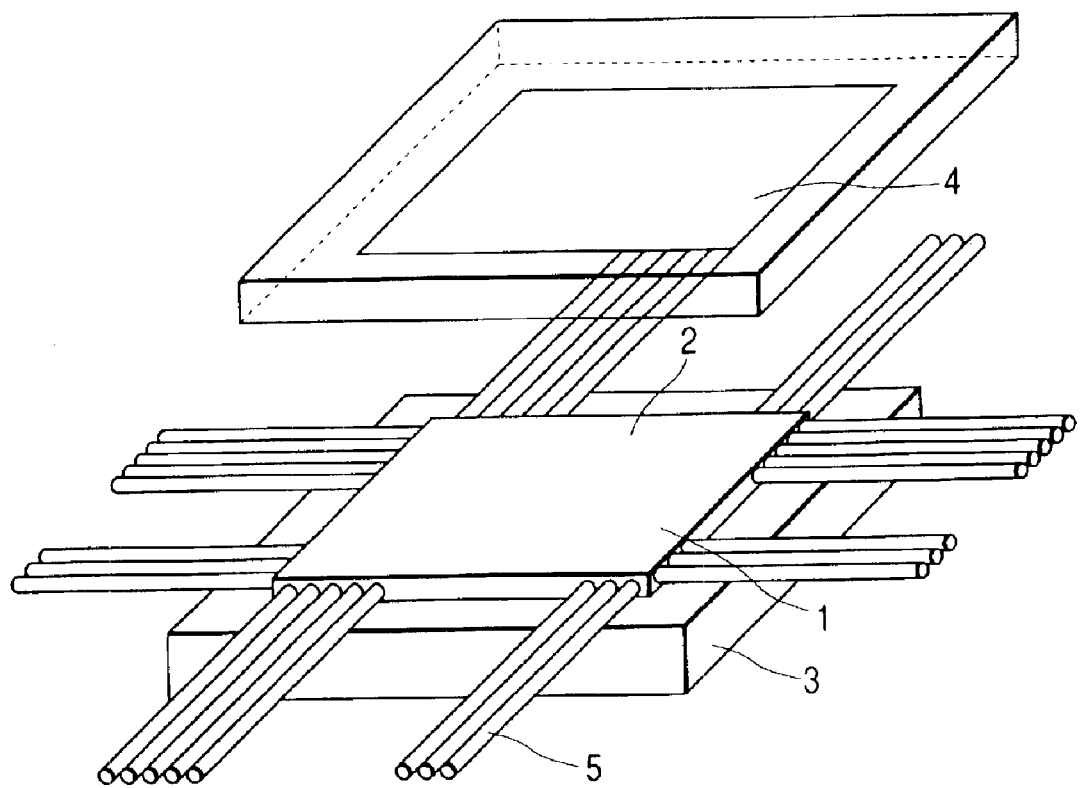
FIG. 1 is a schematic view illustrating one example of an optical switch according to the invention.

FIG. 1 is a perspective view illustrating the structure of a multi-channel optical switch. The multi-channel optical switch of a first embodiment includes a laminated structure in which buffer layers or substrates 1 and nonlinear optical layers or nonlinear optical films 2 are alternately laminated in 16 layers, a supporting substrate 3, and a surface emitting laser 4.

The surface emitting laser 4 may be disposed on any one between the laminated structure and the supporting substrate, or it may be disposed between both sides of the laminated structure and each of the supporting substrate. The positions of the emitting points inside the surface-emitting laser may be arranged regularly or irregularly. In the case where the surface emitting lasers are provided on both sides of the laminated structure, the emitting positions may be disposed at the same positions, or they may be sifted not to overlap.

The number of lamination is not limited to 16, and it is determined by the design conditions of a switching device or a circuit to which the switching device is applied, such as the number of inputted signal light or the number of outputted signal light.

Numerical symbol 5 denotes an optical fiber, and it may be set in advance that which optical fiber serves as an input part to input signal light or which optical fiber serves as an output part to output signal light. Alternatively it may not be set in advance. Receiving signal light from any direction, the optical switch outputs it to the opposite side or refracts it to output, thereby performing the switching operation.

Figure 2:
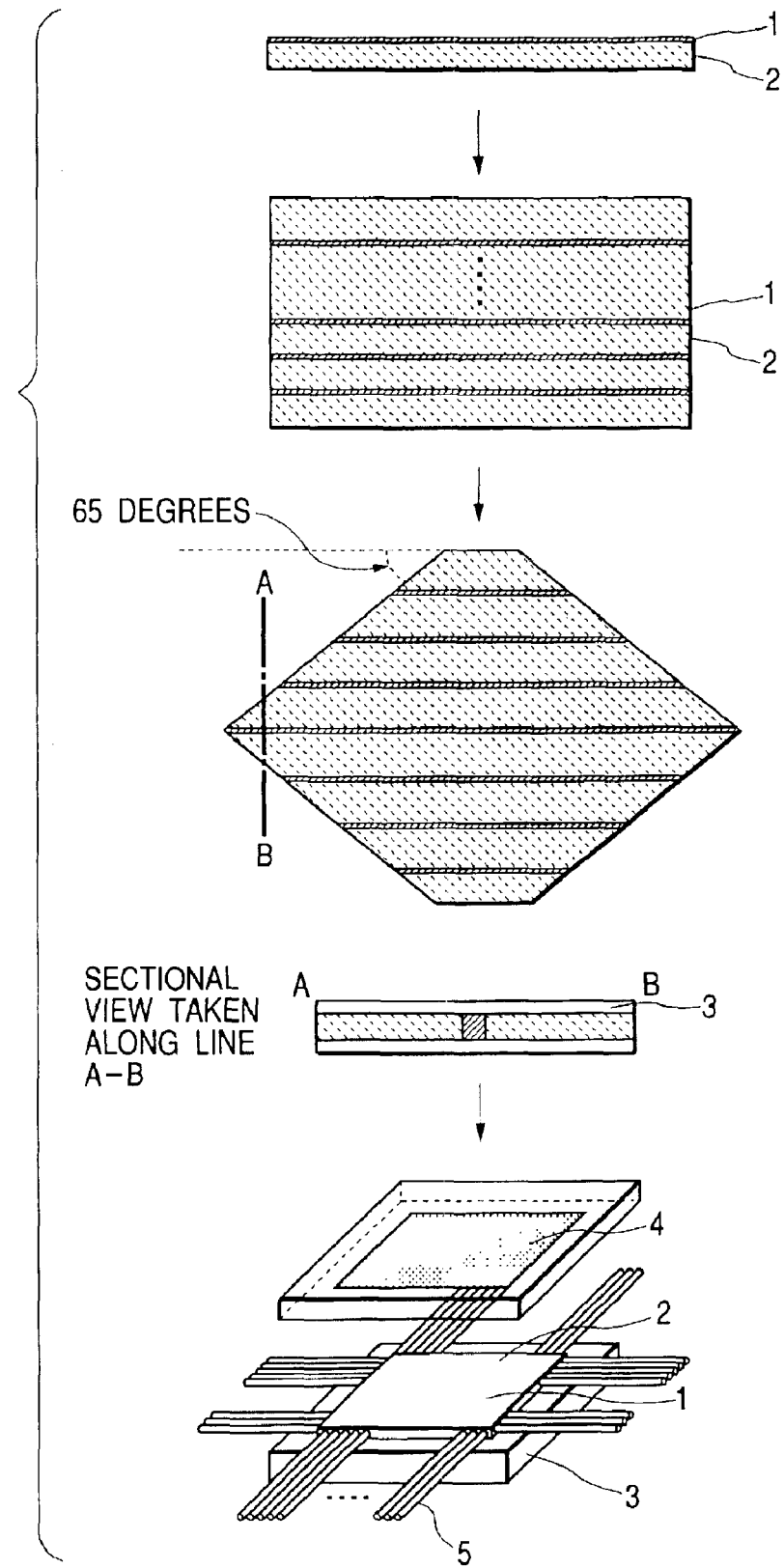
FIG. 2 illustrates one example of a manufacturing process of the optical switch according to the invention.

A method of manufacturing this structure will be explained with reference to FIG. 2.

(A) An oxide thin film of 50 nm is formed on a silicon substrate of 10 mm×10 mm×0.3 mm thick, by means of the RF sputtering method.

(B) The oxide thin film is formed under the following conditions.

(1) Composition of the oxide thin film: the complex oxide of $Co_3O_4$, $S_iO_2$, $T_iO_2$ is made with the weight percentage of 95:3:2.

(2) Sputtering gas: Ar+20% $O_2$, 5 m Torr.

(3) Target: 6 inches in size.

(C) Sixteen pieces of the silicon substrate made by the processing (A) are prepared. The substrates and thin films are laminated in a manner that the thin films each overlie the substrate, and the silicon substrate without the thin film is laminated on the uppermost surface of the laminated substrates.

(D) Both sides of the laminated substrates are processed to form the angle as illustrated in the drawing (for example, 50°).

(E) An adhesive is applied on the sides of the laminated substrates processed, and fused quartz substrates are bonded on both the sides thereof as the supporting substrates for the laminated substrates. The Araldite is selected for the adhesive. The fused quartz substrate is formed into the size of 5 mm×5 mm×3 mm thick, and the vertical thickness is formed into 0.1 mm by polishing after adhesion.

(F) Optical fibers are connected onto the sides of the thin film with the adhesive and a 16-core fiber array connectable from each layer of the substrates. The Araldite is used for the adhesive the same as above; however, an optical adhesive may be applied, and hardened afterwards by using the UV.

(G) A surface-emitting laser is mounted on a position vertical to the surface through which signal light of the laminated structure passes, that is, a position such that laser beams can be irradiated on a specific position of the nonlinear optical layer of the laminated structure. The surface-emitting laser adopts the wavelength of 1200 nm.

Figure 3:
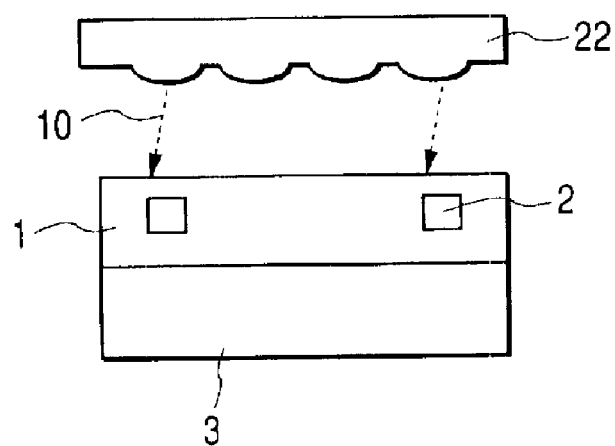
FIG. 3 is a schematic view illustrating one example of a surface-emitting laser according to the invention.
Figure 4:
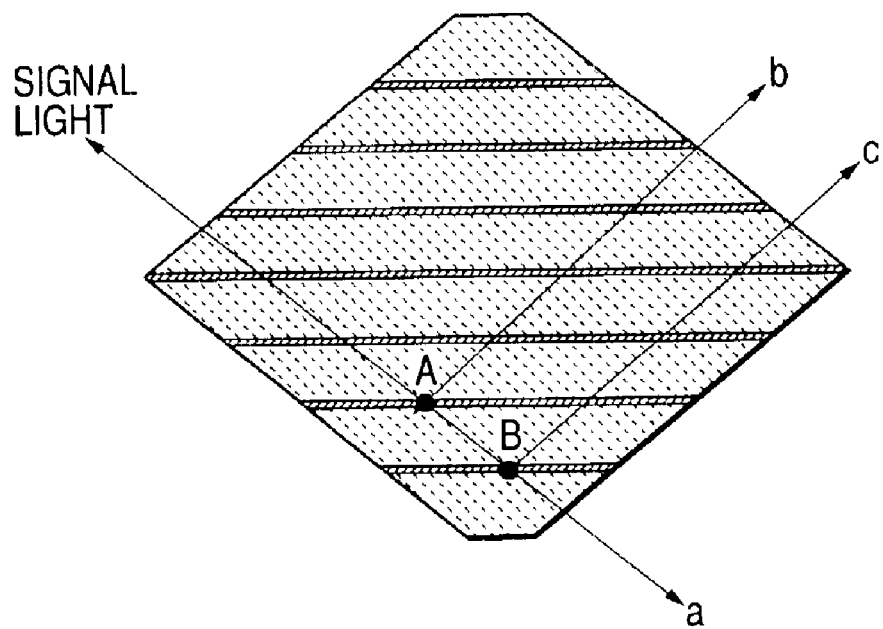
FIG. 4 is a schematic view illustrating one example of the optical switch according to the invention.

FIG. 3 illustrates a method of irradiating excited light by a surface-emitting laser. In FIG. 3, symbol 22 denotes the surface-emitting laser. The branch points of signal light is irradiated with light outgoing from the surface-emitting laser. The surface-emitting laser emits light so that the light advances in a direction to be branched. The timing of emitting lights in the surface-emitting laser is controlled on the basis of the switching information written in the signal light.

Input light was made to fall on from a to the optical switch made up by the foregoing method. The wavelength of the input light was set in 1550 nm, which is a communication wavelength of light. Now, an irradiation mechanism will be explained with FIG. 4 that is a simplified illustration of FIG. 1. When no place was irradiated with the surface-emitting laser, an output light went out to b. When the point A in FIG. 4 was irradiated with the surface emitting laser with the strength of 0.3 $MW/cm^2$, the output light shifted from the point a to the point b, which confirmed that a switching was performed. The response speed at this time was measured as very fast as 11 nanoseconds.

When the strength of the surface-emitting laser was increased to 0.5 $MW/cm^2$, a switching phenomenon was also observed, and the response speed was increased to 1.2 picoseconds, which confirmed very fast. This phenomenon was probably created because the strength of the excited light increased the variation of the refractive index.

Next, the place subjected to irradiation with the surface-emitting laser was shifted from point A to point B. As a result, the output light shifted from point b to point c. The response speed at this time was as very fast as 1.1 picoseconds as with the above. This proved that changing an irradiating position achieves a switching to different directions.

The supporting substrate used here was a fused quartz substrate of the refractive index 1.5. On the other hand, $TiO_2$ is added to the composition of this substrate, thereby varying the refractive index from 1.5 to 1.7. The result is illustrated in FIG. 5. The table shows, from the left column, the contents of $TiO_2$, the refractive index of the supporting substrate, and the output light strength. It is found that the output light strength sharply decreased to 10% or less when $TiO_2$ content exceeds 30% by weight. This phenomenon occurred probably due to the fact that the refractive index of the supporting substrate exceeded 1.6, so that part of the light leaked into the supporting substrate, and the output light strength was decreased.

Next, the processing angle of the laminated substrates was varied to 60°, which is conceivably processable. As the result, the output light was detected in one that was processed with the angle of 50° or more. This result shows that the reflection-transmission type switch cannot be produced unless the surface of the laminated substrates is processed with the angle of 50° or more.

Figure 6:
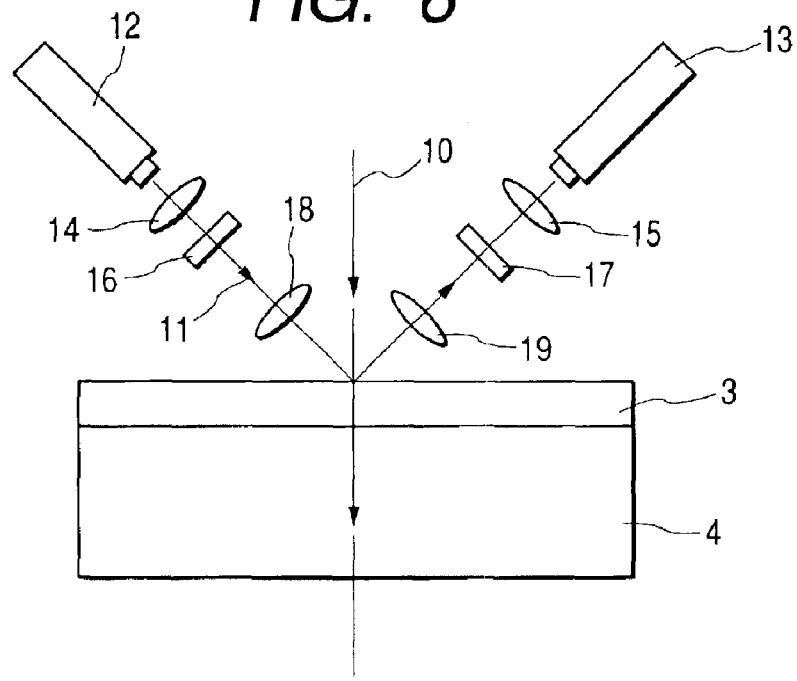
FIG. 6 illustrates one example of a measuring system that measures the optical characteristics of the optical switch according to the invention.

The characteristic changes were also examined when the material of the nonlinear optical thin film was varied. The measurement system is illustrated in FIG. 6. Here, in order to examine the refractive index of each material and the response thereof, samples were prepared, in which only the nonlinear optical thin film 2 was formed on the supporting substrate 3. Measuring light 11 took s-polarization and p-polarization for the sample. The optical system of ellipsometry, namely, the elliptical polarization method was employed in which a refractive index is measured from a difference in the reflection factors of the p-polarization and s-polarization caused by the nonlinear optical thin film 2. The wavelengths of the excited light 10 and the measuring light 11 are arbitrarily variable.

In this measurement, a femtosecond laser of the wavelength 1200 nm was used as a light source of the excited light 10, which facilitates the drive control of oscillation. The maximum output power of this semiconductor laser was 8 mW. As the measuring light 11, laser light, of a femtosecond laser, with the wavelength 1550 nm, which is used in the communications. Both the frequencies of the excited light and the measuring light were 1 kHz, and the laser irradiation time for one period was 0.2 picosecond. The measurement of the response time was calculated by varying the frequency intervals of the excited light and the measuring light. The laser power of the measuring light 11 was sufficiently weakened against the strength of the excited light 10 during the measurement, so that the sample are not excited by the measuring light 11.

Figure 8:
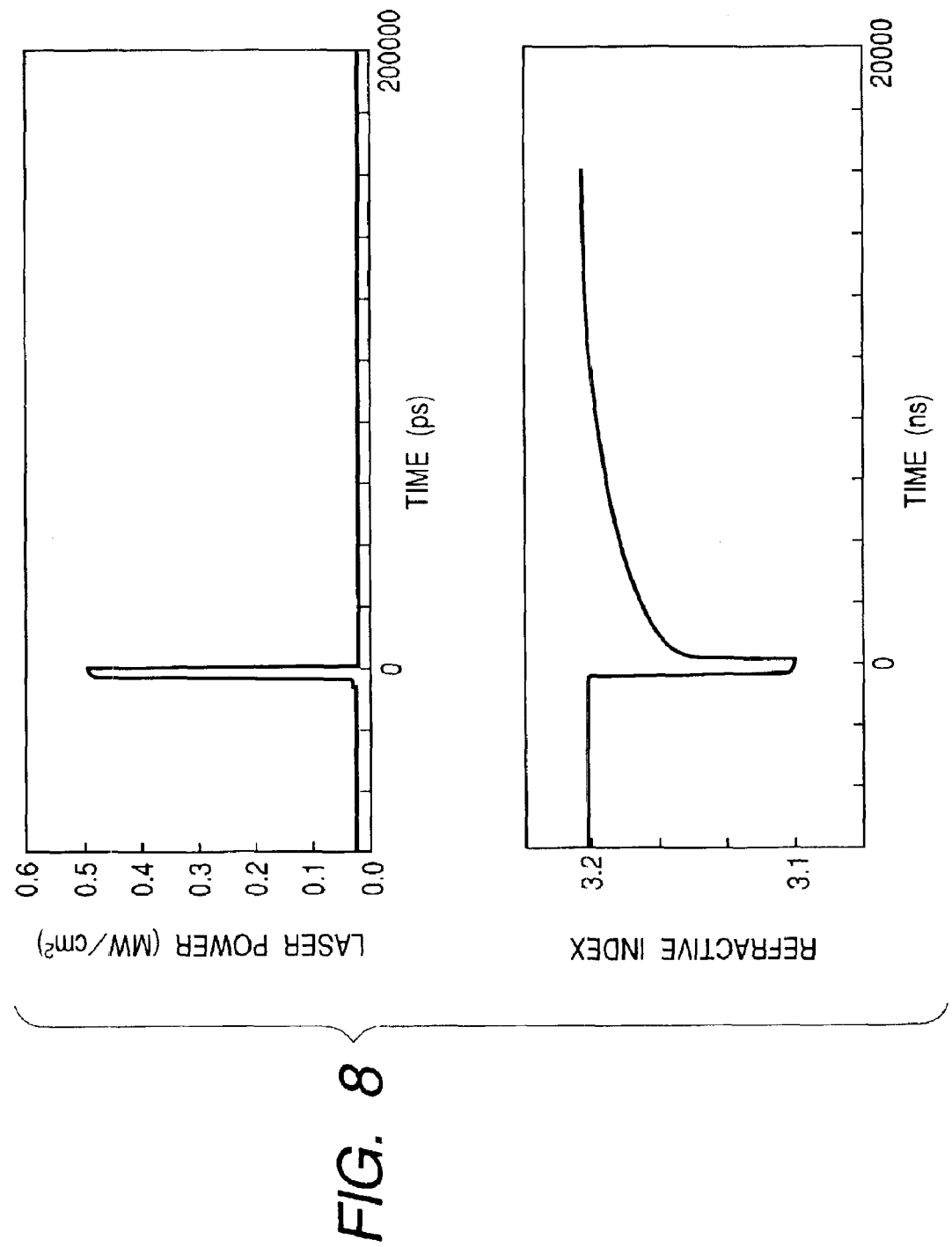
FIG. 8 illustrates the aging characteristics of the laser power and the refractive index, when the nonlinear optical material is irradiated with excited light.

FIG. 8 illustrates one example of variations in the refractive index when the nonlinear optical thin film 2 is irradiated with the excited light 10. The graph shows that the refractive index of the thin film varies after the irradiation of the laser, and then returns to its origin by way of two phases.

Figure 7:
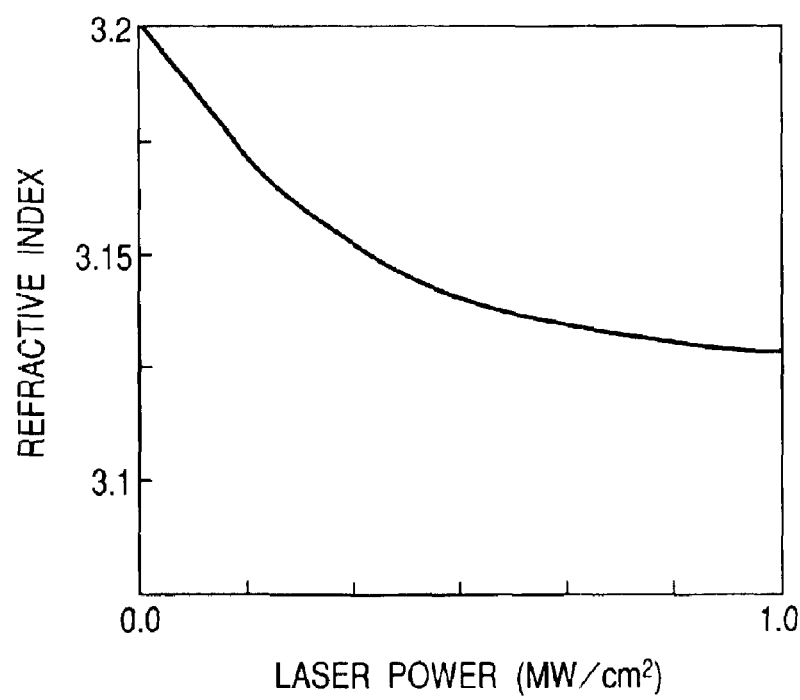
FIG. 7 illustrates the relation between laser power and refractive indexes, when a nonlinear optical thin film is irradiated with excited light.

Accordingly, the refractive index after 1.2 picoseconds from the saturated pulse light power was measured, and the dependence of the refractive index for the power of the exited light 10 was measured. FIG. 7 illustrates the measurement results. The refractive index in a state not irradiated with the excited light 10 is 3.2 with the measurement wavelength of 1550 nm. The refractive index decreases as the strength of the excited light 10 varies; and it is 3.13 with the strength of 0.3 $MW/cm^2$, and 3.1 with the strength of 0.5 $MW/cm^2$. The reason that the response speed varied depending on the strength of the excited light in the foregoing experiment lies probably in that the refractive index transitioned with two phases, and the tendency varied depending on the power.

FIG. 9 illustrates the refractive index, refractive index variation (in a case of the power of the excited light being 0.5 MW/cm$^2$), switching characteristics, and response speed of the nonlinear optical thin film, when examined according to the foregoing method. In the column of the switching characteristic in this table, the case in which the switching is achieved is illustrated with a double-circle, and the case in which the switching is not achieved is illustrated with a cross. The result confirmingly shows that the similar effects are attained and the satisfactory switching characteristics are achieved except the cases of CoO and ZnO.

Since the refractive index variation of CoO is 0.05%, and those of the other materials are 2% or more, it is found that the characteristics is detected when the refractive index variation is 2% or more. When $Co_3O_4$ thin film and $Fe_3O_4$ thin film are used, the refractive index variation is as very large as 3% or more, thereby achieving a very fast switching speed of 1.2 picoseconds. This is probably due to the result by the transition of two phases as mentioned above.

In view of the crystalline structure of this example, the refractive index variations of the thin films using $Co_3O_4$ and $Fe_3O_4$, which have the spinel structure, are 3% or more, and the response speed shows the picosecond order, which possessed especially remarkable variations. This shows that the oxides having the spinel structure are extremely preferable for the switching.

It is also found that the refractive index of the thin film ($Er_4Fe_6O_{14}$, $Nd_4Fe_6O_{14}$) mixed 40% rare earth oxide become 1.9. Accordingly, the fused quartz substrate of $SiO_2$ mixed 40% by weight $TiO_2$, having the refractive index 1.9, was used as a substrate for lamination for these oxide thin films. As a result, the same switching characteristics as those in the above can be attained. In addition, the examination of the output light strength showed that the case using the fused quartz substrate attained a very high efficiency of 95%, compared to the former case attaining the efficiency of 70%.

In the above examples, the material compositions of the nonlinear optical thin films were changed in various combinations. In addition, an attention was paid to the fact that the switching characteristics did not vary in a case of ZnO, but it varied in a case of $Fe_3O_4$, and an examination was made with regard to the compositions among these. FIG. 10 illustrates the results. In FIG. 10, from the left column are listed the composition percentage, average particle diameter, refractive index variation, and switching characteristics.

First of all, an observation of the relation between the ZnO composition and the average particle diameter shows that the average particle diameter increases as ZnO is increased in mixing. In addition, when ZnO is mixed in $Co_3O_4$ by 40% or more, the refractive index variation decreased, so that the switching cannot be attained. The reason presumably lies in that the average particle diameter exceeded 15 nm. Thus, the average particle diameter of 15 nm or less is desirable for the switching.

In this embodiment, the thin film is formed on the silicon substrate or on the fused quartz substrate; however, the thin film having the same composition as silicon or fused quartz is formed on the thin film by the depth of the substrate into a laminated structure, which achieved the same result.

The result of this embodiment shows that an extremely high-speed matrix optical switch whose response time ranges from 1.2 picoseconds to 11 nanoseconds can easily be produced by the use of the laminated structure in FIG. 1. It is also found that the angle of the processed surface, the composition of the thin film, and the supporting substrate give great influences to the switching characteristics.

[Embodiment 2]

Figure 11:
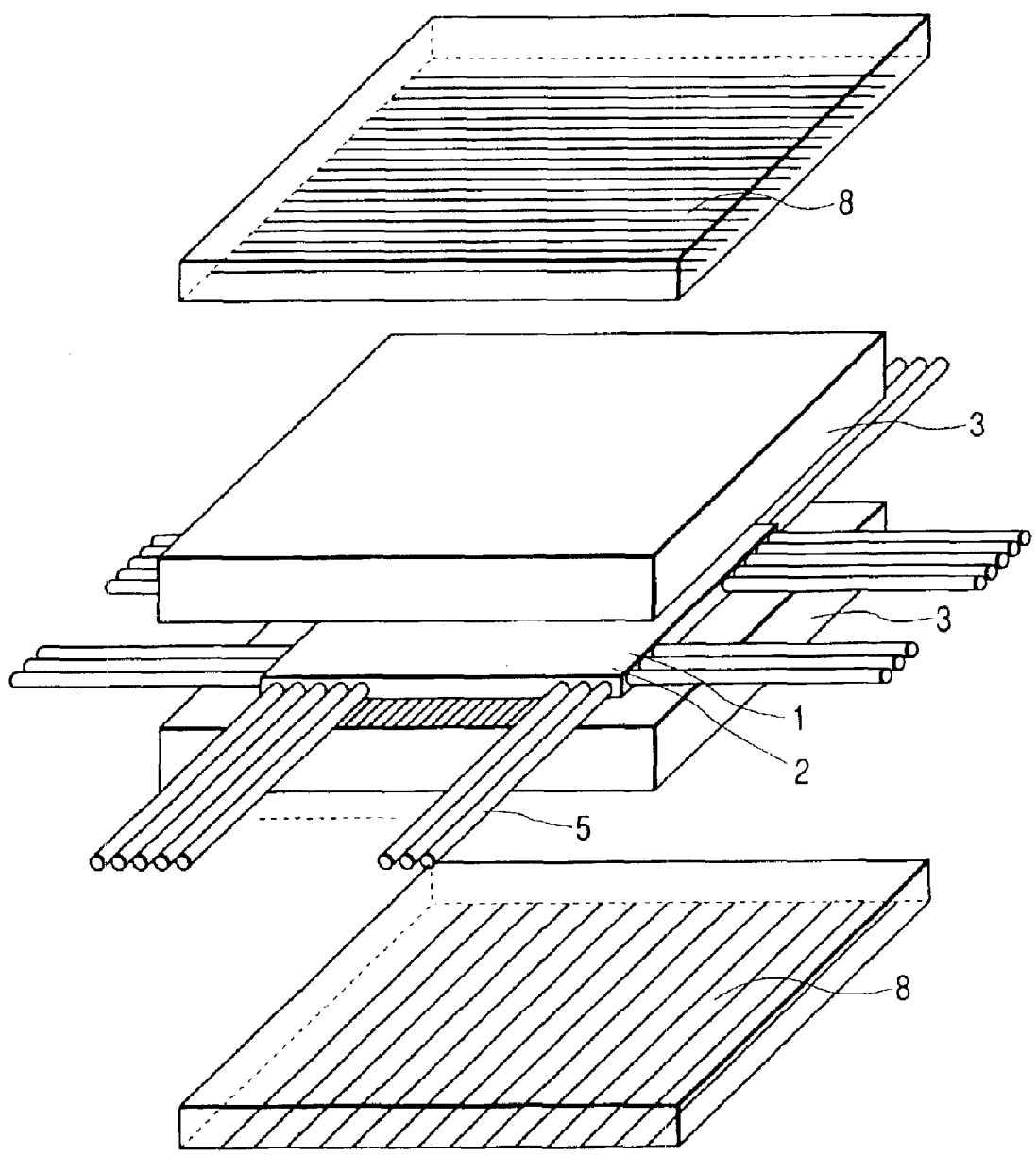
FIG. 11 is a schematic diagram of a second embodiment using an electric field as the external field, according to the invention.

In a second embodiment as illustrated in FIG. 11, a Cr electrode is mounted on the upper side of a part to be excited, and under a supporting substrate, a Cr electrode is formed on the whole surface of a lower substrate as a lower electrode. In other words, an electrode 8 is mounted on the outside of the substrate 3.

The second embodiment 2 has a construction for using an electric field, in contrast to the embodiment 1 that uses the laser beams (excited light) as the external field.

It was observed that when a voltage of 40 volts was applied to the nonlinear optical thin film 2 through a Cr electrode 8 and a lower metal film, an optical path of outgoing light changed from core b to core c in the same manner as the first embodiment 1 involving irradiation with the excited light 10.

However, it was found that a response to the applied pulse voltage was 1000 nanosecond order, which is slow in comparison to the first embodiment. The second embodiment proved that a voltage drive type optical switch could be produced; however, it was found possible to produce a faster switch by using the excited light for the external field.

[Embodiment 3]

An experiment was made such that a fluorescence film ZnS was made luminous by voltage, and the luminescence created a refractive index variation in a nonlinear optical thin film.

A device structure such that the electrode 8 in FIG. 11 is changed into a luminescent surface is used. ZnS and Cr electrodes are deposited on the supporting substrate attached on the uppermost surface. When 40 volts are applied across the Cr electrodes, the ZnS thin film emits fluorescence.

Using this fluorescence gave a variation of the refractive index in the nonlinear optical thin film 2, which confirmed a switching phenomenon with the same speed as that of the embodiment 2. This result found that the fluorescence caused by applying an electric field effected the switching.

According to the invention, a small matrix optical switch excellent in a high-speed response and suitable for switching a large-capacity of information can be achieved by providing a laminated structure using nonlinear optical thin films.

What is claimed is:

1. An optical switch:
    wherein, in an interval of inputted light signals being outputted, a laminated structure having two or more nonlinear optical layers and two or more buffer layers alternately laminated is placed to intersect an optical path through which the light signal inputted passes, the laminated structure having multiple specific point regions; an external field is applied to a specific point region of the nonlinear optical layers from a direction vertical to the optical path to thereby refract the inputted light signal at the specific point region of the nonlinear optical layers where the external field is applied; the inputted light signal is outputted in the direction in which the light signal is refracted, and without the external field being applied, the inputted signal light is made to travel straight so that the light signal is outputted and taken out; whereby optical switching is performed.

2. An optical switch as claimed in claim 1, wherein an angle formed by a rectilinear direction of the inputted light signal and a longitudinal direction of the nonlinear optical layers is equal to or less than 50°.

3. An optical switch as claimed in claim 1, wherein the external field is excited light.

4. An optical switch as claimed in claim 3, further comprising a surface emitting laser for irradiating the non-linear optical layers with the excited light.

5. An optical switch as claimed in claim 1, wherein the external field is an electric field.

6. An optical switch as claimed in claim 5, further comprising a voltage applying electrode or wiring for applying the electric field onto the nonlinear optical layers.

7. An optical switch as claimed in claim 1, wherein a refractive index of a supporting substrate to which the laminated structure is fixed is equal to or less than 1.7.

8. An optical switch as claimed in claim 1, wherein the buffer layers are made of a silicon oxide or a material that contains silicon.

9. An optical switch comprising:
   a laminated structure having a nonlinear optical layer and a buffer layer alternately laminated, said structure being placed to intersect an optical path through which a light signal inputted passes;
   supporting substrates are provided on both sides of the laminated structure and support the laminated structure; and
   an external field input part that is provided between the laminated structure and the supporting substrate and applies an external field to a specific region of the nonlinear optical layer;
   wherein, in an interval of the inputted light signals being outputted, the inputted light signal is refracted at the specific region of the nonlinear optical layer where the external field is applied; the inputted light signal is outputted in the direction in which the light signal is refracted; and without the external field being applied, the inputted signal light is made to travel straight so that the light signal is outputted and taken out; whereby optical switching is performed.

10. An optical switch:
    wherein, in an interval of inputted light signals being outputted, a laminated structure having a nonlinear optical layer and a buffer layer alternately laminated is placed to intersect an optical path through which the light signal inputted passes, the laminated structure having multiple specific point regions; an external field is applied to a specific point region of the nonlinear optical layer from a direction vertical to the optical path to thereby refract the inputted light signal at the specific point region of the nonlinear optical layer where the external field is applied; the inputted light signal is outputted in the direction in which the light signal is refracted; and without the external field being applied, the inputted signal light is made to travel straight so that the light signal is outputted and taken out; whereby optical switching is performed,
    wherein a response speed of the optical switch is equal to or less than 1 $\mu$s.

11. An optical switch as claimed in claim 10, wherein a response speed of the optical switch is equal to or less than 12 ns.

12. An optical switch as claimed in claim 10, wherein the response speed of the optical switch is equal to or less than 1.2 ps.

13. An optical switch:
    wherein, in an interval of inputted light signals being outputted, a laminated structure having a nonlinear optical layer and a buffer layer alternately laminated is placed to intersect an optical path through which the light signal inputted passes; an external field is applied to a specific region of the nonlinear optical layer from a direction vertical to the optical path to thereby refract the inputted light signal at the specific region of the nonlinear optical layer where the external field is applied; the inputted light signal is outputted in the direction in which the light signal is refracted; and without the external field being applied, the inputted signal light is made to travel straight so that the light signal is outputted and taken out; whereby optical switching is performed.
    wherein the nonlinear optical layer is made of a metallic oxide selected from the group consisting of Co, Fe, Cr, Ni, V, Zn, Cu, and Mn, or a complex oxide containing the metallic oxide.

14. An optical switch as claimed in claim 13, wherein the nonlinear optical layer contains an oxide selected from the group consisting of a silicon oxide, titanium oxide, and aluminum oxide.

15. An optical switch as claimed in claim 14, wherein the nonlinear optical layer contains a rare-earth oxide.

16. An optical switch:
    wherein, in an interval of inputted light signals being outputted, a laminated structure having a nonlinear optical layer and a buffer layer alternately laminated is placed to intersect an optical path through which the light signal inputted passes; an external field is applied to a specific region of the nonlinear optical layer from a direction vertical to the optical path to thereby refract the inputted light signal at the specific region of the nonlinear optical layer where the external field is applied; the inputted light signal is outputted in the direction in which the light signal is refracted; and without the external field being applied, the inputted signal light is made to travel straight so that the light signal is outputted and taken out; whereby optical switching is performed,
    wherein the nonlinear optical layer is composed of an aggregate of particles, of which average particle diameter is equal to or less than 15 nm.

17. An optical switch:
    wherein, in an interval of inputted light signals being outputted, a laminated structure having a nonlinear optical layer and a buffer layer alternately laminated is placed to intersect an optical path through which the light signal inputted passes; an external field is applied to a specific region of the nonlinear optical layer from a direction vertical to the optical path to thereby refract the inputted light signal at the specific region of the nonlinear optical layer where the external field is applied; the inputted light signal is outputted in the direction in which the light signal is refracted; and without the external field being applied, the inputted signal light is made to travel straight so that the light signal is outputted and taken out; whereby optical switching is performed,
    wherein the crystalline structure of the particles constituting the nonlinear optical layer is a spinel structure and the buffer layer-is made of a silicon oxide or a material that contains silicon.

* * * * *